United States Patent [19]
Webber, Jr.

[11] Patent Number: 6,167,378
[45] Date of Patent: *Dec. 26, 2000

[54] AUTOMATED BACK OFFICE TRANSACTION METHOD AND SYSTEM

[76] Inventor: Donald Gary Webber, Jr., 4 Glacier, Mt. Baldy, Calif. 91759-0820

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,925

[22] Filed: Jan. 21, 1997

[51] Int. Cl.[7] .................................................. G06F 17/60

[52] U.S. Cl. ................................................... 705/8; 705/7

[58] Field of Search ................................. 705/1, 26, 27, 705/8, 10, 7; 707/200, 500, 104

[56] References Cited

U.S. PATENT DOCUMENTS

| | | | |
|---|---|---|---|
| 4,799,156 | 1/1989 | Shavit et al. | 705/26 |
| 4,887,208 | 12/1989 | Schneider et al. | 705/28 |
| 4,912,309 | 3/1990 | Danielson et al. | 235/380 |
| 4,920,488 | 4/1990 | Filley | 364/403 |
| 5,031,214 | 7/1991 | Dziewit | 713/176 |
| 5,163,091 | 11/1992 | Graziano et al. | 713/176 |
| 5,239,462 | 8/1993 | Jones et al. | 364/408 |
| 5,272,623 | 12/1993 | Grubb et al. | 717/1 |
| 5,287,268 | 2/1994 | McCarthy | 364/405 |
| 5,310,997 | 5/1994 | Roach et al. | 235/375 |
| 5,319,542 | 6/1994 | King, Jr. et al. | 705/27 |
| 5,362,948 | 11/1994 | Morimoto | 235/376 |
| 5,406,475 | 4/1995 | Kouchi et al. | 705/8 |
| 5,434,394 | 7/1995 | Roach | 235/375 |
| 5,634,016 | 5/1997 | Steadham, Jr. et al. | 345/329 |
| 5,666,493 | 9/1997 | Wojcik et al. | 705/26 |
| 5,677,955 | 10/1997 | Doggett et al. | 705/76 |
| 5,694,551 | 12/1997 | Doyle et al. | 705/26 |
| 5,974,395 | 10/1999 | Bellini et al. | 705/9 |

FOREIGN PATENT DOCUMENTS 410097574   4/1998   Japan ............................... G06F 17/60

OTHER PUBLICATIONS

Currents; Feb. 1996; Unix review; *Electronics Commerce*; Norton Greenfeld; pp. 15–16, 18 and 20.
*Technology Business Bytes*; "Starring Role"; Cheryl J. Goldberg; Aug. 1996; pp. 45, 46, 47.
*Electronics Commerce*; (EDI Update); "Will EDI Proliferate", Nahid Jilovec; Jan. 17, 1997; 1 pg.
*Electronics Commerce*; "EDI Experiments With the NET"; Anne Knowles; Jan. 1997 pp. 106, 109, 110.
*Commercial Applications*; "Netscape Merchant System Data Sheet"; Feb. 10, 1996; pp. 1–7.
Netscape—Interactive Commerce Solution—Feb. 10, 1996); pp. 1–3.
Hewlett Packard; Solution Guide; Feb. 10, 1996); pp. 1–3.
Oneserver Online Application; "The Server for Serious Business on the Net"–Feb. 10, 1996); pp. 1–3.

(List continued on next page.)

*Primary Examiner*—Emanuel Todd Voeltz
*Assistant Examiner*—Alexander Kalinowski
*Attorney, Agent, or Firm*—Foley & Lardner

[57] ABSTRACT

A method and system provides for digital automation of the transaction space. Digital contracts are programmed to reflect the intended activity or operations of the parties in connection with their purpose. Those contracts can be drafted, ratified and stored by parties situated at any global location, so that the contracts operate on a centralized platform, whereby computational activity is initiated based on the occurrence of events independent of the system. Briefly, the device provides the framework within which contracts operate when triggered by events in order to automatically perform their intended and programmed purpose. In part, the contracts and the instructions regarding functions contained within contracts are linked based on their common purpose, that is, a specific product or service. Dissemination of instructions and data is automated and the means for dissemination and communication between the system and the parties can be as simple as an internet connection, as well as other connections. The method and system make it possible to culminate with automatic payment to the parties.

29 Claims, 6 Drawing Sheets

OTHER PUBLICATIONS

One Server "Frequently Asked Questions"; Feb. 10, 1996) pp. 1–4.

First Data Corp. "Interactive Commerce Solution"; Dec., 1995; 1 pg.

Connect Inc., AT&T—New Release; Ed Forman—Connect Inc., Oct. 25, 1995 pp. 1–2.

Oneserver; "Preview the Results of the IDC Survey" Feb. 10, 1996) pp. 1–3.

Netscape Products; "Netscape Commerce Server"; Feb. 10, 1996; pp 1–5.

Greene et al., "MRP II: Out with the Old . . . Available: Real–Time EDI, Multiplant Functions, More MRP II Software Systems How to Negotiate the Right Price", Computerworld, vol. 26, No. 23, pp. 73, 77–79, 82–85, Jun. 1992.

Holland, Christopher et al., "The evolution of a global cash management system", Sloan Management Review, vol. 36, No. 1, pp. 37–47, Dec. 1994.

Greenfield, Norton, "Unix Review: Electronic Commerce", Currents, pp. 15, 16, 18, and 20, Feb. 1996.

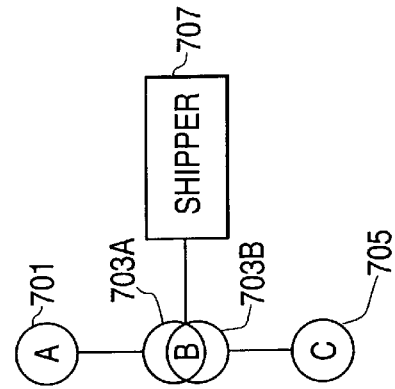
FIG. 6
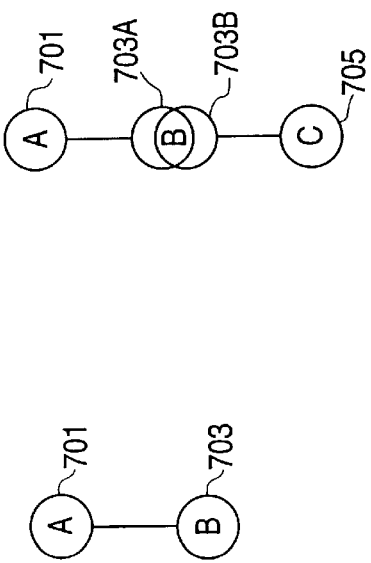
FIG. 7
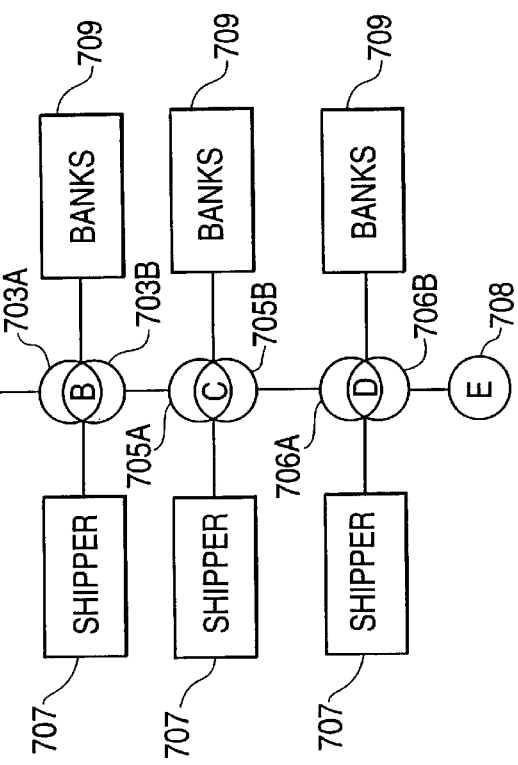
FIG. 8
FIG. 5

AUTOMATED BACK OFFICE TRANSACTION METHOD AND SYSTEM

BACKGROUND OF THE INVENTION

The present invention concerns a method and system for the digital automation of the transaction space. Automation of the transaction space includes, in part, automation of supplier fulfillment instructions, special instructions, logistics, shipping coordination, generation of transactional data, necessary reporting, payments and banking in consideration of completed transactions. The parties participating in the transaction space include, first, sellers that digitally transmit point of sale ("POS") data to the system, then the primary order fulfillment company, the shipper, banks and preceding levels of suppliers, manufacturers, shippers and banks. Specifically, the method and system enable digital contracts of these parties to operate together. The digital contracts are drafted, are ratified for usage by the contracting parties, are stored and operate automatically upon the occurrence of certain events. Two or even thousands of contracts may represent the business instructions of the parties for a given product or transaction. When certain events occur, the system identifies the contracts that are associated with the specified transaction. These contracts are linked; then, an event triggers computational activity as specified in the contracts. The various activities of the transaction space for the supply chain are thereby automated. Traditionally, with conventional computing and accounting and with EDI, business is conducted on a transactional basis, not on a contract basis, with computational operations physically located at each entity. Transactional data is transmitted sequentially, from suppliers to manufacturers, up through the supply chain ending at the top with the final seller. With electronic data interchange (EDI), transactions are transmitted electronically; the initiation of a corresponding transaction may be accomplished manually or even mechanically automated. The linkage of parties by EDI has thus far been limited to only two levels of automation, that is invoice generation upon EDI receipt of a product order ("PO"). This system uses contracts to generate new transactional data and to minimize or eliminate the need to exchange transactional data in order to generate new data. Further, the transactional data can be consolidated into report form, thus precluding the need to deliver all transactional data to each party.

A conventional sales architecture provides that an order is placed at a point of sale ("POS"), and the ordered product is eventually delivered to the ordering party. There are a number of significant events and actions, nevertheless, that must occur manually prior to delivery of the product. Most of these events and actions are not traditionally automated. To the contrary, an intense amount of human interaction is conventionally required in order to complete the commercial transaction initiated by the order.

Consider, by way of example, a commercial transaction wherein a buyer places an order at a POS for a particular device. This initiates the seller's action of ordering the device from the supplier. The supplier will then order the device from the manufacturer. In turn, the manufacturer will order the correct parts required to make and deliver the device from various parts suppliers. The manufacturer will pay the various parts suppliers, resulting in the manufacturer's bank transferring funds from the manufacturer's account to the various parts suppliers' accounts at the suppliers' banks, and the parts suppliers will deliver the parts to the manufacturer. Once the manufacturer delivers the manufactured device to the supplier, the supplier will pay the manufacturer. Thereafter, there is a transfer of funds from the supplier's account to the manufacturer's account at their respective financial institutions. The supplier will deliver the part to the seller, resulting in a transfer of funds from the seller to the supplier. Finally, the seller delivers the part to the buyer, resulting in a transfer of funds from the buyer to the seller from their respective accounts. Each of these steps occurs independently and sequentially. Moreover, any particular link in the chain of the commercial transaction will require independent action. Such action may include physical verification of receipt of the goods from a carrier, physical or automated verification of credit, physical authorization of payment, etc. Additionally, inventorying is done by each party in the chain. Each action taken requires some human input, magnifying chance for error. When commercial transactions on a national basis are aggregated, these actions are repeated innumerable times each day.

In another example, consider "back office" applications. "Back office" refers to the work such as accounting and computing used to fulfill orders, to invoice, to log receipts, etc. This has also been denominated the "transaction space." Typical accounting involves many manual procedures including, in part, logging purchase orders, drafting bills of materials, ordering shipping, scheduling shipping, invoicing, recording sales, issuing purchase orders, drafting receivers, receiving bills, recording payables, accounting for these transactions and functions, credit, collections, receivables and payables. As listed here, these represent fifteen manual steps, much staffing of personnel, large volumes of paper and, consequently, the handling and filing of large amounts of paper documents. These steps do not include additional steps of journal, ledgers, financial reports and management analysis.

By using electronic commerce ("EC") and electronic document interchange ("EDI"), the computer of one company may link to the computer of another company. In these conventional EDI systems, a transactional document is exchanged electronically instead of exchanging conventional paper documents. This requires the exchange of large volumes of data, sequentially, from company to company. Moreover, the EDI ordinarily occurs over private networks. Even where there is EDI, each step in a stage of EC requires human intervention, just as in the earlier example of purchasing a device. Therefore, although certain efficiencies are obtained by using EDI, other potentially large efficiencies are not reached.

Lisa Nishimoto, writing for InfoWorld concerning problems besetting automated commerce, reports that "one thorny problem for proponents of electronic commerce on the Internet is: How will states (maybe the federal government) tax the sale of goods and services online." The more that commercial transactions occur via electronic commerce, the more this problem is aggravated.

Conventional components of a commercial transaction system are well known. For example, traditional integrated inventory systems are disclosed in U.S. Pat. Nos. 5,310,997 and 5,434,394 to Roach et al. These patents describe systems for processing merchandise sale transactions, to integrate point of sale and warehouse processing functions, and to enable delivery of merchandise to customers in the shortest possible time. The reach of the integration is highly limited, however, and the concept of integration is not extended to any degree.

It is known in the industry to automate various individual actions in a variety of sales architectures. For example, U.S. Pat. No. 5,362,948 to Morimoto discloses the automation of order placing and receiving operations of traders realized by an on-line system. Similarly, U.S. Pat. No. 5,287,268 to McCarthy concerns accumulating incentive points at points of sale for a consumer from purchases at multiple merchants; U.S. Pat. No. 5,239,462 to Jones et al. relates to real-time approval of a potential borrower; and U.S. Pat. No. 4,920,488 to Filley generally teaches a database system to account for physical inventory.

In addition, much of the hardware used in sales architectures is well known. U.S. Pat. No. 4,912,309 to Danielson et al., which discloses the specifics of a point of sale terminal, is merely one example. There is also available a large number of hardware and software configurations which may globally interconnect a pair of two links in the chain using common protocols.

Furthermore, physically ratifying each step in the process of fulfilling an order is conventionally known. An individual step may be partially automated, as in U.S. Pat. No. 4,887,208 to Schneider et al., which discloses an inventory system including on-line communication between the retailer and the manufacturer enabling confirmation at the purchase stage. Also well-known are individual links, such as banks, suppliers, retailers, included in a supply chain needed for fulfilling a conventional order.

Unfortunately, there has never been an integrated method and system capable of completely automating the commercial transaction throughout the supply chain. Moreover, no system provides for bundling together individual transactions for multiple parties wherein the information and data for fulfilling a commercial transaction are determined substantially simultaneously, rather than sequentially upon occurrence of individual events or for a specified purpose. In addition, no one system elegantly addresses the problem of governmental impositions such as tax.

SUMMARY OF THE INVENTION

It is, therefore, an object of the present invention to serve as much as all parties to the supply chain of a product.

It is another object of the invention to automate the transaction space of the supply chain.

Another object is to reduce cost by eliminating the need for human intervention.

One more object of the invention is to improve accuracy by its digital, mechanical methods.

Yet another object is to save time by its digital, mechanical automation.

A further object is to simplify the ability of individual parties to program their own contracts/business.

Another object of the invention is that the repetition of routine transactions is fully automated.

An object of the invention is the eliminate the need for most credit, collection, billing, receivables, payables and cash functions.

One more object of the invention is to streamline the manual staging and fulfilling of orders.

Another object of the invention is to eliminate the need for manual processing, enabling a paperless system.

Yet another object is to serve large and small businesses.

A further object is to serve all sellers including internet, intranet, conventional retailers, direct marketers, business to business, project management and government at most levels.

An advantage of the invention is that it optimizes efficiency because it operates simultaneously, not sequentially, for all parties and contracts.

Additional advantages are that the invention reduces cost by the automatic generation of new transactional data; automates the digital dissemination of data and instructions; eliminates the need for most paper documents; and stores transactional data digitally.

Another advantage of the invention is that it is possible to reduce the volume of data exchange by more than 99.99%, and reduce the volume of cash transactions by 90% or more (as estimated).

Additional advantages of the invention are that it compresses and consolidates the business of the supply chain, and facilitates just-in-time delivery for the whole, integrated chain.

Another advantage is to ensure a high level of user trust and system reliability.

Yet another advantage is that the invention compresses the time for completion of a product's business cycle.

One more advantage of the invention is that it simplifies the digital connection of the parties with the system.

One more advantage of the invention is that it facilitates management by exception.

Another advantage of the invention is that a small business will be afforded the advantages of big systems.

An advantage is that full integration of parties facilitates improved customer service.

Another advantage is that security, authentication, automatic audit and verification are facilitated.

An advantage of the invention is that it integrates with automated warehouse systems.

Another advantage of the invention is that other data bases may be incorporated for the systems operation.

Yet another advantage is that business can be transacted at digital speed.

Another advantage is that data and reports are known by all to be an accurate reflection of transactional events because the system is mechanical and contract based.

An advantage is that the invention eliminates duplication and repetition and reduces cost.

Another advantage is that much of the data exchanges can be transacted via common internet type connections, thus reducing high connection hardware and software cost.

An advantage is that the invention is suitable for internal purposes for large companies or for a multitude of separate companies.

One possible feature of the invention is that it culminates with automatic payment in consideration of transactions.

Another possible feature of the invention is that it may finance the entire chain from proceeds of the final sale.

Another feature of the invention is that it may use a toolkit or template to simplify programming/drafting of contracts.

Another feature of the invention is that it efficiently stores digital contracts for use when signaled.

An optional feature of the invention is that customer payments may be processed only after proof of delivery.

A feature of the invention is that security and operability are facilitated when transactions are automatically assigned an encrypted id.

A potential feature of the invention is that parties can view data without the need to download data.

A feature of the invention is that cash basis reporting may, optionally, eliminate the need to process large volumes of all accrual records and data.

Another feature of the invention is that electronic funds transfer ("EFT") payments may be made automatically to the parties.

The above objects, advantages and features and others will become more apparent upon reading the description herein.

In accordance with one embodiment of the invention, there is provided a method for digital automation of supply chains. In a computerized system, at least one non-ratified contract is generated for a transaction in one supply chain of the supply chains, wherein the non-ratified contract has a plurality of terms. The contract is ratified and stored as a ratified contract in a database in the computerized system. If a term of the plurality of terms in the ratified contract indicates that at least one next contract is necessary for a next transaction in the supply chain, the above steps are repeated for the at least one next contract, and links between the ratified contract and the next contract are stored in the database.

In accordance with another aspect of the invention, there is provided a method for digital automation of supply chains. In a computerized system, there is generated at least one non-ratified contract for a transaction in one supply chain of the supply chains, wherein the non-ratified contract has a plurality of terms. The contract is ratified and stored as a ratified contract in a database in the computerized system. If a term of the plurality of terms in the ratified contract indicates that at least one next contract is necessary for a next transaction in the supply chain, the foregoing steps are repeated for the at least one next contract. Links between the ratified contract and the next contract are stored in the database.

In accordance with another aspect of the invention, there is provided a system for digital automation of supply chains, each of the supply chains having a plurality of transactions between a plurality of parties including a buyer, a seller and a supplier, including at least one transaction between the buyer and the seller, and a transaction between the seller and the supplier. There is provided storage in a database, for each transaction of the plurality of transactions in one of the supply chains for at least one non-ratified contract. The non-ratified contract has a plurality of terms, and the non-ratified contract is approved by one of the parties. There is also provided storage, for each transaction for a ratified contract in the database corresponding to each of the non-ratified contracts, wherein the ratified contract is approved by an other one of the parties. Also included are links between the ratified contract for the transaction in the supply chain between the buyer and the seller and the ratified contract for the transaction in the supply chain between the seller and the supplier.

BRIEF DESCRIPTION OF THE DRAWINGS

Illustrative embodiments are illustrated in the drawings and described in detail below.

In the drawings:

FIG. 5 is a functional diagram illustrating a contract linked between primary parties.

FIG. 6 is a functional diagram illustrating the contract of FIG. 7 linked with corresponding and underlying parties and contracts.

FIG. 7 is a functional diagram illustrating the contract of FIGS. 7–8 linked to an ancillary function.

FIG. 8 is a functional diagram illustrating another contract linked to multiple corresponding and underlying parties and contracts.

DETAILED DESCRIPTION OF THE PREFERRED EMBODIMENTS

Figure 1:
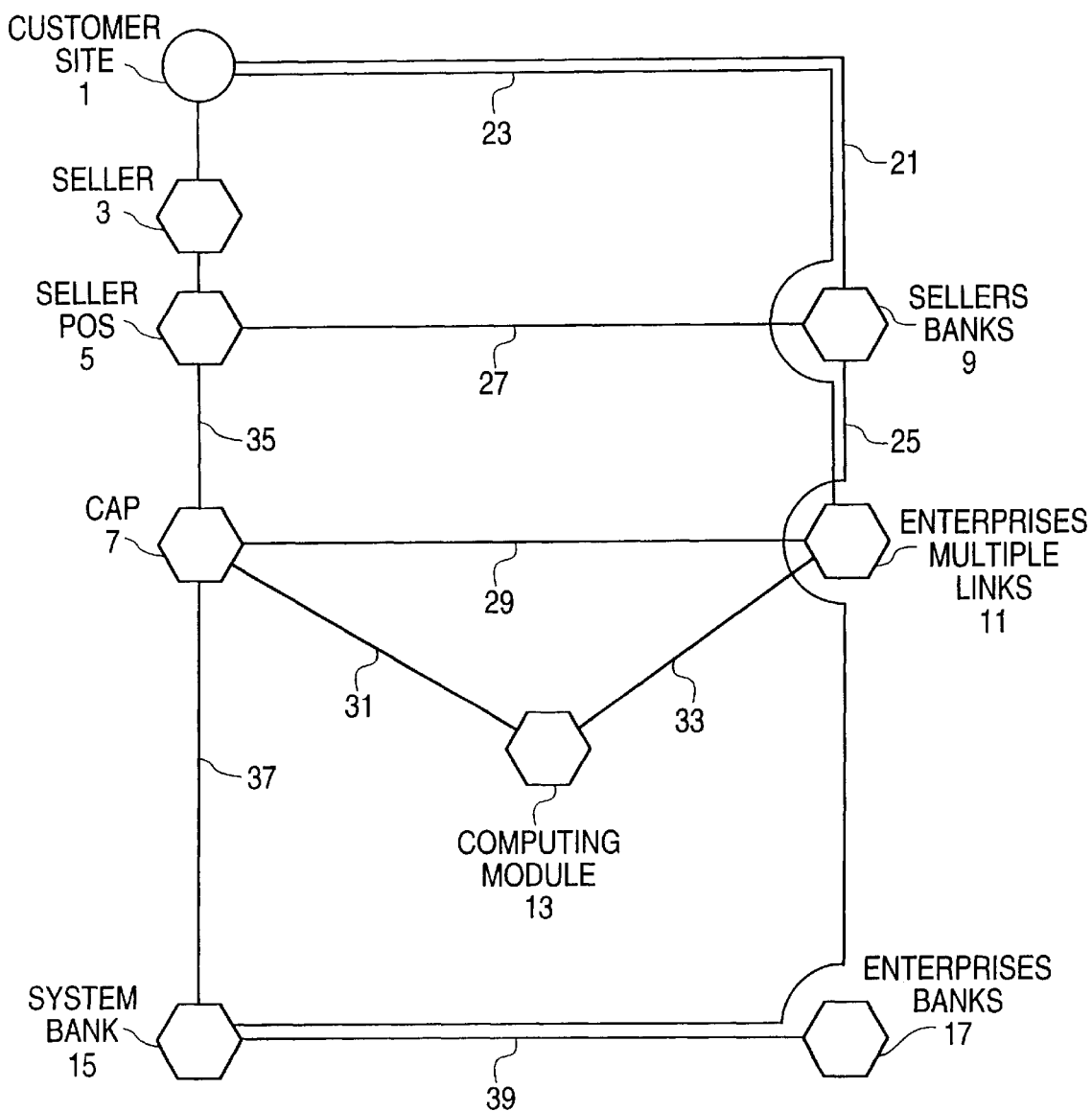
FIG. 1 illustrates events, actions and the flow of data in an automated back office transaction method and system.

The system provides the computational mechanism, physically independent of the parties, wherein the business of the trading partners of the supply chain is conducted, as opposed to conducting the computing physically at the facilities of each and every party to the supply chain. The system may operate advantageously as a private or an Internet Service Provider (ISP). The computers of the parties are connected by modem to the communications and activity platform ("CAP") or by other means. The system provides a module that defines the means and terms for each parties' digital connection of their computer(s) with the system.

The system advantageously provides a template or toolkit that helps the parties draft or program their own contracts. When authorized by the parties to the programmed contract, the contract is stored for future use.

The system uses the programmed contracts when signaled at a time when the contract is needed for its operation.

The digital contracts of the parties are programmed by the parties to contain operational instructions. Possible instructions include terms and conditions for that which is contained in conventional contracts; i.e., that which is contained in instructions that specify the activity required to fulfill the obligations and define the activity of two or more parties for the various functions.

The contracts contain instructions regarding execution of contracts, linkages to other contracts, designated operational activity when triggered, fulfillment instructions, shipping instructions, generation of transactional data, approval/deviation terms and conditions, sales or other tax computations, reporting requirements (both financial and management), EFT instructions or other terms and instructions as may be determined as necessary by the parties to the contract.

When triggered, the contracts are linked with other corresponding contracts stored within the system, and then perform their specified computational activity. The contracts operate in combination with other contracts that are similarly identified.

The contracts may contain instructions for a multitude of functions. By their nature, each of those separate functions are, to some extent, common from contract to contract. As a further refinement of the contracts, each of the functions are effectively separated according to the nature of the function and identified with a common or standard identifier. Each separate function contains the instructions that are necessary with respect to its unique computational obligation or activity.

Each of the contracts are identified according to product, service or activity. Two or a multitude of contracts for a single product, service or activity may be linked. The functions within each contract are themselves linked according to the function that is being performed. When events trigger activity the contracts and the functions operate simultaneously together to initiate computational activity.

The initial event that activates activity is a seller's transmission of its digital POS data to the CAP. The CAP's receipt of a buyer's Purchase Order ("PO") data also initiates activity. The seller's POS data is then moved from the CAP to the computing module. It then operates in the computing module to generate and disseminate fulfillment instructions and shipping instructions. When the goods are delivered the next event occurs.

The next event that triggers computation of transactional data, dissemination of that data and culminates with automatic payment in consideration of the completed transactions is a shipper's Proof of Delivery ("POD"). Shippers digitally transmit their POD to the CAP where it is stored for use when needed.

The general structure and components of an automated back office transaction method and system are illustrated in FIG. 1. The links in a chain of transactions include a customer site 1, a seller site 3, a seller's POS 5, a computing module 7, a seller's bank(s) 9, multiple links to enterprises 11, a CAP 13, a system bank 15, and a bank(s) for the enterprises 17.

Other components of the system are events that trigger activity. Events trigger links to the contract system. If an event occurs, it activates preferably all of the levels of contracts at all links in the chain down through the end suppliers. Entities in the supply chain for contracts which are thus activated include shippers for the goods and banks.

The parties to the transactions access their data via their modem link to the CAP 7. The CAP is used, in part, so that the parties can define the connection of their computers with the system, can draft and execute contracts, can resolve disputes, and can initially receive POS, PO and POD data that reflects the events. Much of the data generated by the computing module can be viewed through the CAP via a commonly used internet type link and much of the data can be retrieved through the same common type internet link, either digitally or in hard copy. The CAP optionally may be used as a mailbox, for requests for proposals, for purchasing, for market research or for any other business purpose designated by the parties.

One example of an event that triggers is a sale. If a customer site 1 initiates a sale, that sale data is notified or transmitted to the seller site 3. All subsequent possible levels of contracts will be then linked and activated.

Another example of an event that triggers is when a common carrier delivers a requested product to the requester. Consider, for example, where requested goods are delivered from one of the suppliers to the seller by common carrier. At the time of delivery, a digital record is created by the common carrier and that record is delivered to the CAP confirming that the item was delivered. This triggers calculation of transaction obligations in the computing module, culminating with payments to the suppliers. Upon the occurrence of the event that triggers, the computing module 13 performs accounting calculations and generates invoices to follow accepted standards. The transfer of funds occurs automatically, so that payment is automatic. Similarly, once the requested product is delivered to the customer 1 by a common carrier, this event triggers yet another accounting calculation, invoice and transfer of funds.

One event will trigger as much computational activity within the supply chain as there exists for linked contractual parties. Therefore, the activity is accomplished substantially simultaneously, rather than sequentially; the activity occurs without the need for intermediate human intervention.

In the preferred embodiment of the system, money due Party "A" and also due to "B" by "A" can be deducted from what is due "A" and electronically paid to "B", thus reducing the volume of cash transactions.

In a preferred embodiment of the system, the contract contains contractual instructions which cause the computing module to calculate additional amounts such as sales taxes and beverage taxes.

It should be noted at this time that the contracts are digital rather than paper. In the above given example, there is no paper exchanged between the seller, any of the enterprises, or any of the banks. In the preferred embodiment, sellers collect sale data (e.g., product, price, amount) and transmit it to the CAP.

In one version of the system, a template of a digital contract is provided by the CAP 7. Using the template of the digital contract, a party completes its terms of the contract to include default or non-default terms.

Illustrated below are minimal fields of a possible template, ready for completion by a party:

| Product: xxxxxxxxxxxx | Amount: 0001 |
| --- | --- |

Next, in order to perform the step of "contracting", the digital contract is first executed (as explained below) by one party when submitted to the CAP 7 as a "non-ratified contract". Non-ratified contracts are forwarded to the CAP 13, and then notified to an individual computer or digital system located remotely at the other party. The other party may either manually or digitally accept the contract. Once the contract is accepted or executed by the other party (a "ratified contract"), the ratified contract is stored in a contracts database by the computing module 13. Generally the event of ratifying a contract authorizes that contract to operate once any time period which may be specified in the contract has lapsed. The next contract or contracts will advantageously be linked to the initiating contract.

As shown by the above examples, the entire vertical chain of manufacturing, distribution and sales involved in a commercial transaction is served by the system.

The customer site 1, for only one example, or seller site 3, as another example, could consist of a commercially available home page such as the Interactive Commerce Solution by Connect Inc. on the worldwide web. Such a site provides at a minimum the ability to initiate an order (thereby collecting sale data), and may include the capability to view products in an on-line catalog, track the order, and check on purchase verification, order fulfillment, and order confirmation. The site may also provide a secure means of permitting purchases only by pre-approved members.

In the preferred embodiment, any of a number of conventionally available protocols may be utilized in order to reduce the volume of data communicated between the computing module 7, the CAP 13, the enterprises 11, etc. Other protocols or compressed transmissions may be utilized in order to reduce the volume or speed the handling of data.

In the preferred embodiment, the CAP and computing module utilize available secure socket layer protocols and public key encryption technology, such as that available from RSA Data security. A commercially available firewall advantageously protects and verifies a customer identifier associated with the customer, a bank identifier associated with the bank, and passwords. The CAP advantageously also logs the POS data sent to it by sellers; logs whether contracts are added, deleted or modified; provides links for automated contractual connections; provides links for other database data and services; automates entry of goods ready to ship; automates entry of shipper verification (POD); automates entry of deviations; and automates EFT transactions.

Advantageously, each "contract" initiated in the CAP and computing module is assigned a product/service identifier that is unique to a product or service. Moreover, each "contract" includes an entity identifier associated with some or all of the parties contractually linked to the transaction. The contracts are therefore multithreaded such that multiple connections to multiple contracts are readily handled.

The database (shown in FIG. 2) stores each contract, and when activated by triggers, each contract is linked or threaded with the others in the supply chain. The database includes a digital contracts data base 295, which includes contracts which are recast into digital form. The digital form contract is preferably a standardized form wherein each contractual function is aggregated, and so that linkages and pathways between contracts are evident and operational. The digital contracts in the chain of transactions for each requested product are stored in the contracts database 295. Preferably the database is on one operating platform, although it may be distributed, or it may even consist of multiple databases on distributed platforms.

A digital contract contains the terms and conditions required by the parties in connection with their respective obligations, including obligations for timing for performance, instructions for electronic banking, communications, transactional calculations, necessary operational instructions, and other functionality deemed necessary by the parties. It is likely that an extremely wide variety of contracts with a multitude of terms and functions will eventually be used, which reflects market reality. However, by their nature, each of the terms and functions are, to some extent, common from contract to contract, and like functions may be identified in contracts by a standard or common identifier. The database of contracts 295 may be conventionally indexed or otherwise formatted at one or more levels to optimize search and retrieval of contracts. For example the database of contracts 295 could be indexed by product, and contracts for particular products could be indexed by function. To further facilitate searching, it is possible that a contract could specify linkage to contracts for a particular subset of other parties. A digital contract incidentally should be taken as authorizing a service provider to operate in accordance with the terms in the digital contract.

A digital contract is "executed" by any acceptable means, including digital signature or automatic ratification. A digital contract may be for one or more products, goods, or services between individual parties. A contract for an entity to supply specific goods or services is linked to another contract for another entity to acquire those specific goods or services.

The fulfillment of the requests at each level of the commercial transaction is activated based on the occurrence of events. When an event occurs, it triggers a contractual operation, i.e., fulfilling fulfillment obligations, for example.

Events should include completion of a sale request at a POS, PO, POD. A sale request at a point of sale is transmitted to the CAP by the seller and triggers the initiation of operations for the supply chain. A traditional time expiration event may be utilized internally by the CAP or computing module to trigger contractual operations for which timing is specified within contracts.

Events (POS, PO, POD) are associated with functions (described in detail below) contained within separate contracts, and when the events occur, the event will trigger certain contracts associated with the transaction.

The contracts for each respective entity are linked to the requesting supplier of goods or services, and to other entities or data as may be further required in the transaction. If a particular transaction within the chain generates multiple fulfillment obligations within one entity, these will be linked together. Multiple fulfillment obligations within one entity can be linked the same as an entity-to-entity linked contract.

All of the contracts of all of the entities within a supply chain for a particular commercial transaction preferably are linked together. Such a supply chain may be composed of any number of entities, or departments and divisions within one entity. The contracts of distinct entities are advantageously linked together by use of product/transaction identifiers. Product/transaction identifiers are preferably assigned at the time of ratification of each digital contract. (Other links are possible, such as pointers or codes.)

The CAP 260 navigates the contractual pathway when initiated by a transaction or reporting event. By following multiple links within vertically related entities, the entire chain of supply is navigated.

During the process of fulfillment of an order, the following steps occur. Reference is made to FIG. 1. First, the customer site 1 completes a purchase with the seller 3. Then, the seller's POS transmits a contract to the CAP 7 via an available communication link 35. The contract is preferably stored by the CAP in a "hold for processing" mode. Once the contract is ratified, fulfillment data is calculated by the computing module 13 according to terms within the ratified contracts, and is additionally derived from standard contractual terms and rules for each particular type of product. The fulfillment instructions in the ratified contract will include, for example, a scheduling date, terms and rules. Fulfillment obligations are determined based on a combination of the stored POS data and the terms and rules in the fulfillment data associated with a particular type of product/contract. Optionally, fulfillment obligations may be factored by inventory management and order point specifications or systems calculation and determination of distribution, and selection of shippers or common carriers.

The computing module 13 may consolidate multiple orders for a particular type of product from multiple customers, in order to facilitate inventory management. Further, multiple purchase orders from a single customer may be identified and merged by the CAP in order to consolidate shipments from one supplier.

Once it is determined that a product needs shipment from one entity to the next, the CAP transmits a subset of the stored data which is necessary to schedule a particular shipment. The CAP or computing module retains and stores data and identifications sufficient to track a scheduled shipment.

A financial transaction between two entities in the chain is triggered by POD of the requested product. This is preferably determined by the transmission of shipping data at the pick up and delivery site by the shipper. The shipping data includes data for identifying a particular transaction, and other relevant components: the product/transaction identifier to identify and link to the contract that reflects and governs the transaction. A purchaser optionally may condition payment upon receipt of goods, as evidenced by the POD event from delivery having occurred. (Delivery may occur from a conventional shipment or even, for example, by digital shipment.) One advantage of this option is that it provides additional consumer protection for consumers buying goods from the Internet or from Direct Marketers.

Conventionally, common carriers digitally track the movement of the goods they ship. When goods are delivered by a shipper to a customer, shippers optionally log the customer signature, and transmit notice to the CAP that the delivery has been made. This triggering POD event according to the system replaces paper receivers which are used in conventional accounting. The CAP collects the conventional shipper's POD data, recognizes it as an event, and advantageously stores that data with the product/transaction identifier (optionally encrypted) for future use. At a time specified, with any stored POD, the POD event triggers the activation of transactional calculations for the goods that have been delivered. One advantage of using POD as a triggering event is that it permits computational activity to be initiated without the need for human or mechanical intervention.

Upon receipt of the POD transmission, the digital automated system initiates financial calculations for the contract that governs the particular transaction (determined by the product/transaction identifier). The digital automated system automatically calculates the payable due to and from each party to the particular transaction according to well-known accounting principles and practices. The calculated payable may optionally be automatically audited by a commercially available auditing program to verify the accuracy of the payable.

Any reporting and transactional data, as specified within a contract by the parties to a contract, can be automatically generated.

Moreover, all data for all transactions, journals, ledgers, financial reports, and management reports for a particular party may be viewed by that party via connection to the CAP. This connection could be made via the linked networks referred to as the internet, for example. Advantageously, only the contracting party has access to view this data; third parties are preferably not granted access. The ability to view data on the internet-type CAP (as opposed to transmitting the data to the party's computer) will further reduce the need or desire of parties to themselves collect large volumes of transactional data. If necessary, governmental authorities could be afforded access to transactional data to view and audit, for example, a party's compliance with tax reporting obligations.

Additionally, automatic payment to the parties by EFT can occur at the time and on terms specified by the contract. For example, EFT can be scheduled to occur on the 15th of each month. The contract includes instructions about the terms and methods by which the final cash settlement is made. When transactions are deemed approved and complete, the computing module automatically compiles data and transmits EFT instructions to institutions which provide EFT services. EFT saves the cost of payables functions, check writing and handling by all parties. The amount to be transferred between financial institutions of the contracting parties is automatically determined by compiling totals for the completed (delivered and received) transactions of the respective parties. EFT services are conventionally provided by several companies. The conventional EFT functions could be incorporated into the system. Note that the contract may include a bank identifier, to be used in the EFT instructions.

Final cash settlement optionally can be delayed until after each of the affected parties approves or disapproves the settlement. When final cash settlement is made, the parties are optionally notified and reports are distributed. The cash settlement reports may include a cash basis record of the cash settlement, thus precluding the need for the parties to handle the large volume of other accrual type documents. Cash basis accounting would advantageously reduce the volume of data. Accrual data could be distributed at times specified by a party, for example at quarter's end, in order to adjust financial records for accrual factors.

In the event that there is a dispute regarding the shipment, a receivable good, deliverable service, or payable, a deviation protocol is provided to record that there is a dispute. In this situation, the calculated payable are flagged as being in dispute. Transfer of funds is advantageously delayed until the parties reconcile the dispute, at which time the dispute flag is cleared.

The automated funds transfer occurs once payables are calculated. A conventional EFT can be initiated for the benefit of the parties to the transaction, for the payable amount, and according to the respective parties' bank identifiers. In the preferred embodiment, however, the system also provides a system EFT "bank" 15 (see FIG. 1). The EFT "bank" 15 will merge payment obligations, by deducting the amount due from one company to its suppliers from the amount due to that company from third parties, so that the amount remaining is paid directly to the suppliers. This may culminate with automatic payment to the parties by EFT. This step can be repeated so that the payments from the "top" of the chain are allocated among all parties to the supply chain (to the bottom).

In the preferred embodiment, security is provided by including a commercially available firewall on the system that performs accounting and reporting.

In the preferred embodiment, any party to a transaction can request and view the data stored in the database concerning the individual transaction. Moreover, any party can request, review or retrieve data concerning that particular party, its products, and its services, from the data stored in the database.

Reports can be prepared and delivered for any transaction, if requested. Such reports are in various formats, including reporting of individual transactions, transactions accumulated by particular party, or transactions accumulated in a particular time period. The reports can be delivered in electronic format, printed format, or both.

EXAMPLE

Assume for the purpose of illustration the conventional business of selling wine directly to customers, that is, direct marketing. The winery or its broker contracts with the direct marketer to sell the winery's wine. The final retail customer buys the wine from the direct marketer and the wine is to be shipped directly to the customer. The direct marketer collects payment from the customer by credit card. The direct marketer negotiates the credit card payment with its bank and deposits the funds in its bank account. The seller transmits sale data to system.

The other parties to this supply chain include the fulfillment company that orders containers from the container company for shipping the wine, stores the winery's wine, then packs the wine, affixes shipping labels, and stages the wine for pick up by the shipper. The wine shipper is notified of the shipping order and may transmit its own shipping labels to the fulfillment company for it to affix to the shipping container. The container company is also notified. The wine shipper then picks up the container and delivers it to the retail customer. The shipper may deliver the wine for consolidated shipment to another common carrier. Further, the seller has collected sales tax that is due the state and beverage taxes that are to be paid to the state. Lastly, a fee is to be paid for the service of automating the transaction space, the topic of this invention.

This single example of one winery and multiple parties will be repeated hundreds of times for hundreds of different products and parties.

The invention herein described automates the transaction space by generating fulfillment instructions for both wine and shipping containers. It may analyze and plan shipping logistics. It notifies both the container company shipper and the wine shipper. It communicates with the shippers and tracks movement and collects POD from shippers. It generates transactional data for this transaction. It provides reports of transactions for all parties, reports to be viewed or retrieved. It culminates with automatic payment to the parties in consideration of the transaction, including the transfer of monies from the seller to the system's bank, and from the system's bank to the winery, the container company, to both shippers, to the fulfillment company, to the state for sales taxes and to the state for beverage taxes and finally, to the service for the service of automating the transaction space.

Further, the system may notify the affected parties of inventory status and order points. Customer disputes are identified and resolved. Shipper selection may be analyzed as well as distribution options.

In this process the parties themselves need not verify credit, invoice, perform payables functions, collect or perform any number of conventional computing and accounting functions; that is done by this system.

Figure 2:
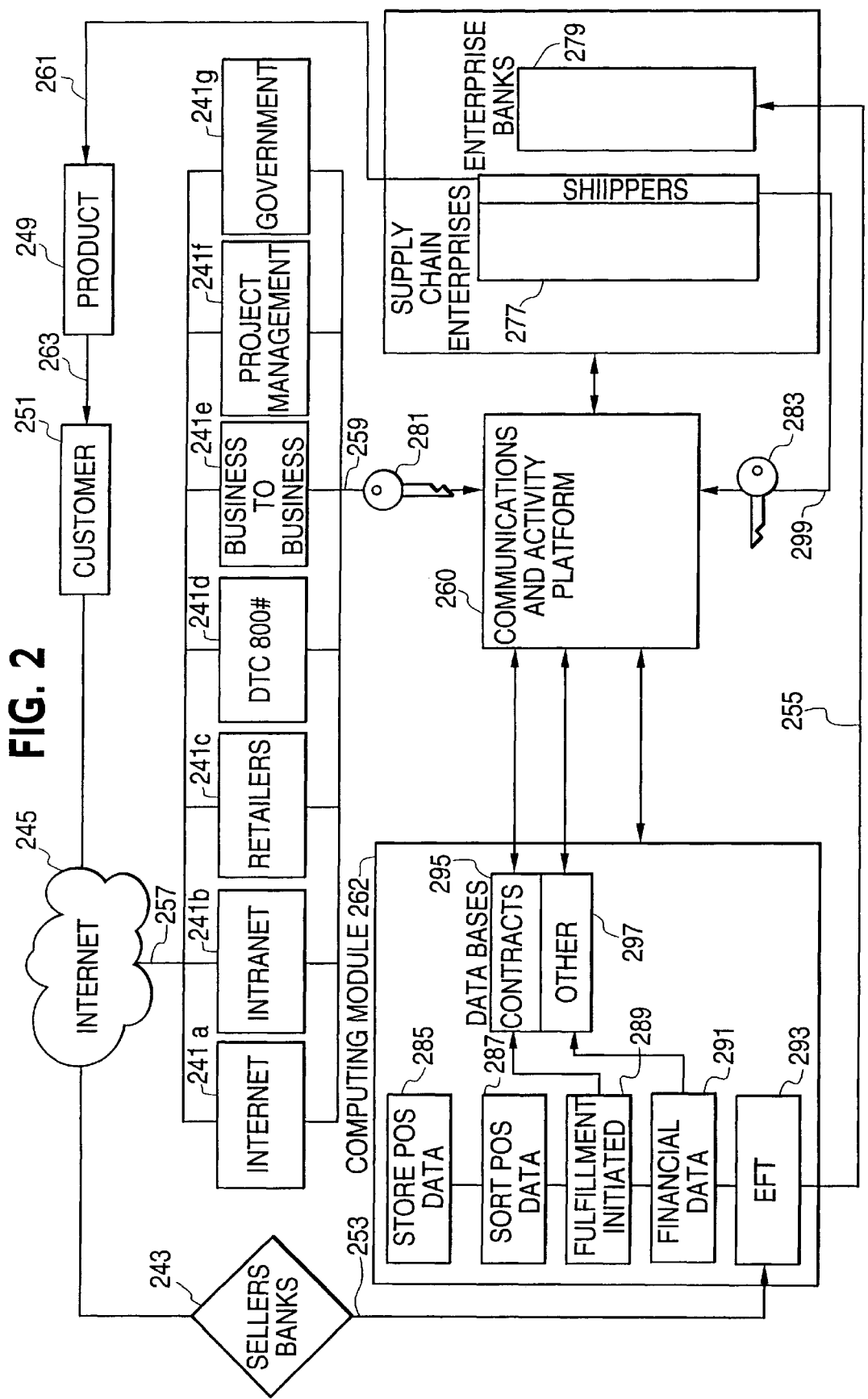
FIG. 2 is a block diagram illustrating the automated digital contract system connected via the internet.

FIG. 2 is a diagram illustrating the system connected to a multitude of sellers. The system includes a CAP 260, various enterprises 277 and enterprise banks 279. Sellers deliver their POS data to the CAP and the CAP is connected to other entities included in a chain of transactions via communication link 259. These selling entities may include the internet 241a, an intranet 241b, conventional retailer connections 241c, a DTC 800 number 241d, business to business communication links 241e, government entities 241g, and other new applications 241f which are adopted in the industry such as query tone, or other telephone-like access methods. Sellers are digitally connected to the system via a public or private internet. The entity enterprise connections are also globally linked; in the present illustration they are connected to the internet 245 via communication link 257. Banks that are utilized as a part of financial transactions in the digital automated system such as the sellers bank 243 are also connected to the internet 245 and CAP 260 via communication links CAP 255, 253 respectively. A requested product 249 is provided to a customer 251 via shipping channels 261, 263, respectively.

Figure 3:
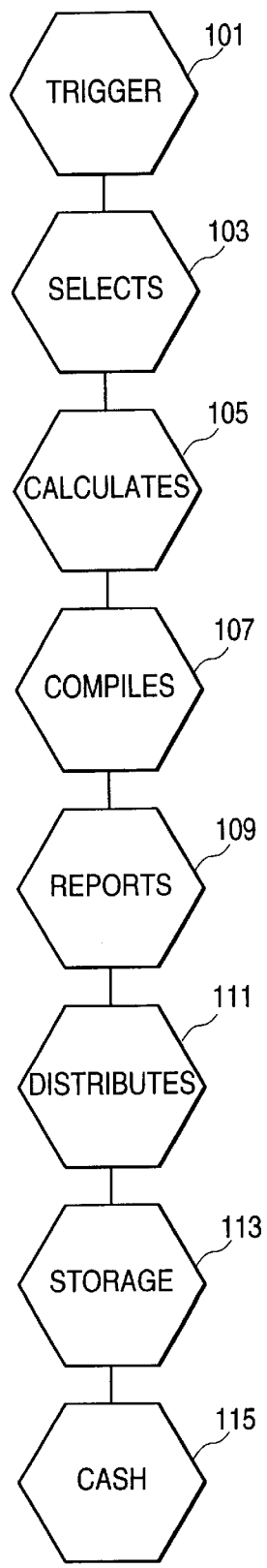
FIG. 3 is a flow diagram illustrating the flow of actions taken after a triggering event.

FIG. 3 is a flow diagram illustrating the flow of actions taken after a trigger event occurs at step 101. At step 101, a link is created to the "pathway". At step 103, the CAP, via the computing module, selects information stored in the database that is required for the requested transaction, including contracts, and identifies the linked contracts. At step 105, the system makes all calculations for the requested transaction, including transactional data based on contractual terms. At step 107, the system compiles the information necessary for each contract's transactions. At step 109, the system generates digital and any hard copy reports according to terms specified in each contract. At step 111, the system distributes the request to the next link in the chain of transactions according to terms contained in each individual contract. At step 113, the system stores information reflecting the calculated information, compiled information, reported information, and distributed information. At step 115, the system calculates "digital cash" and handles the financial transactions including EFT according to the terms of each individual contract, and the merging of contractual obligations and payments.

The CAP is advantageously designed in a modular fashion so that each function is a separate independent subsystem. These independent subsystems include: security and firewalls, auditing, inventory management, management reporting, accounting, statistical logging and reporting, shipping options, distribution options, purchasing services, delivery/shipping schedules, integration of shipping with suppliers.

The CAP and computing module calculate data which corresponds to conventional transactions including the following: purchase orders, shipping and packing documents, bills of lading, shipper documents and instructions, invoices, receivers, payment checks. The CAP also prepares financial reports on: inventory management and adjustments, receivables, payable, sales, costs and gross profits. Each of these conventional transaction and financial reports can be automatically generated in digital format and/or hard copy format if that is desired by a person using the system. Nevertheless, a distinct advantage of the digital automated system is that it eliminates the need for much of these individual conventional transactional reports.

Reference is made to FIG. 2. Illustrated are a computing module 262, a CAP 260, overall supply chain enterprises 277 and enterprise banks 279. The CAP 260 communicates with entities included in the supply chain via communication link 259, and further via modem, POTS, ISDN and other devices and lines which are used to enable communication. In addition, the computing devices used by the supply chain entities to communicate with the system preferably permit the system to log on (if necessary) to the supply chain entity's computing device; to access inventory data and price data; to deliver POS, PO and POD data; to transmit fulfillment instructions; to transfer transactional data, financial reports, management reports; and to transfer funds, for example.

The CAP 260 acts as a gateway to the communications service provider 262. The CAP is used to perform functions including the drafting of contracts, deviation resolution, viewing of data, and viewing of reports.

Encryption or security 281, 283 may be included in the communication link 259 between the CAP 260 and the selling entities in the supply chain, and between the CAP 260 and the supply chain enterprises 277, respectively. These sellers include the CAP internet 241a, an intranet 241b, conventional retailer connection 241c, a DTC 800 number 241d, business to business communication links 241e, project management applications 241f, and government 241g, for example. Banks that are utilized as a part of financial transactions in the CAP such as the sellers bank 243 are also connected to the computing module 262 via communication link 253. A requested product 249 is provided to a customer 251 via shipping channel 261. POD is provided from the shippers for the supply chain enterprises 277 via communication link 299 to the CAP 260.

Security is preferably provided on the CAP, as is illustrated in FIG. 2. For example, a seller's POS data are assigned an encrypted transactional identifier when transmitted by the computer at the seller to the CAP, thus inhibiting tampering or modification. A shipper's POD data is received at the CAP through the secure link 299 to shippers. Other information which is advantageously transmitted across a secure link to the CAP include dispute resolution data and a seller's POS or PO when received at the CAP. A different level of security can be provided for each of the above, utilizing conventional security protocols and methods. It is possible to provide a level of security corresponding to each level of risk.

Transactional instructions generated by the CAP and the linked contract are sent, initially, to the primary fulfillment source and shipper. This establishes initially a three level record of data with encrypted transactional identifier which inhibits modification of any one record without simultaneously modifying the others thus reducing the risk of tampering. EFT would be made on terms and to accounts specified in the secured contracts.

An additional level of security may be provided by only activating contracts which are marked with a special authorization encryption or signature. Modification of any one element in the contract and CAP without simultaneously making the same change at all levels would immediately become evident and should readily be detected. Since the contracts are linked together, reconciliation, verification and authentication can be performed by comparing transactional data at one level for one party with the corresponding transaction for all parties at all levels. Alternatively, the CAP can operate as an exception system, by identifying deviations, rather than reviewing all transactional details.

According to user option, the CAP produces an exception and deviation report where deviations are identified. The advantage of managing by exception is that this eliminates time required to study and analyze the volume of information of conforming, non-deviational transactions. To the extent that there are deviations to transactions, the CAP preferably offers a party the opportunity to view its exceptions through the CAP. Optionally, the deviation data can be downloaded to the party's computer for its own handling. When the dispute is resolved by the parties, one or both of the parties adjust and reconcile the transaction via the CAP. Adjustments are preferably entered by authorized users. The CAP should protect against entry of unauthorized adjustments by use of, for example, user identifications and passwords, or other conventional security means. In addition, the system preferably verifies authenticity by comparing the encrypted id number from the reconciled data with the expected encrypted identifier.

The computing module 262 includes a database of the stored contracts 295, and any other desired databases 297, such as shipper rates, sales taxes. Information on EFT 293 is received at the computing module 262, processed as described in detail herein, and further financial information is communicated between the CAP 260 and the computing module 262 and the enterprise banks 279.

Supply chain enterprises 277 could include, for example, a seller, primary fulfillment entity, a district warehouse, a regional warehouse, a manufacturing warehouse(s), a manufacturer, a supplier to a manufacturer, and governments to whom taxes are due. Each of these entities is part of the supply chain, and will communicate with the CAP 260 in order to initially draft contracts, view information, and to provide identification and information that link contracts. The CAP could also be programmed to include mailboxes for communication between entities, and a dispute identification mechanism, for example where final delivery never occurred.

Figure 4:
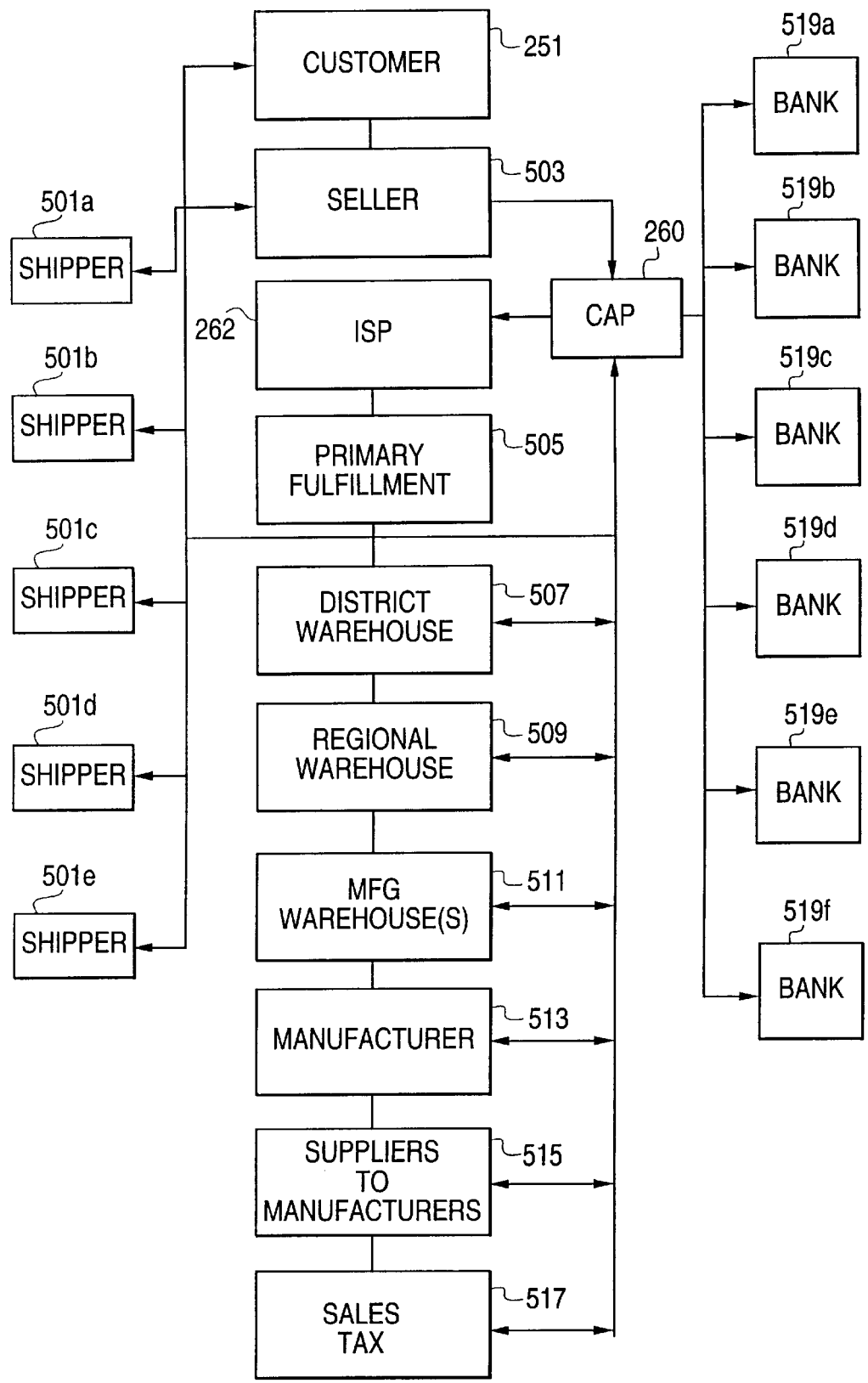
FIG. 4 is a block diagram illustrating the linkage of parties and contract to a supply chain via the automated digital contract system.

FIG. 4 is a block diagram illustrating an example of the relationships of parties to an exemplary supply chain. Here, the customer 251 contacts the seller 503 to order a product. The seller 503 contacts the CAP 260 with POS data. The CAP 260 links the seller's POS data to a contract of the primary fulfillment 505, which in turn links to a contract of a district warehouse 507, a regional warehouse 509, a manufacturing warehouse 511, manufacturers 513, numerous suppliers to the manufacturer 515, and optionally to pay governmental sales tax 517. Each of these entities' contracts are linked by identifiers as described herein. The CAP 260 transmits electronic instructions to transfer funds among the respective banks a–f of the parties. The CAP 260 also transmits instructions to shippers 501a–e to ship product from one entity to the next or to the final customer. Upon delivery of a product from a shipper 501a–e to the recipient, a POD event is generated. The electronic transfer of funds from the customer to the seller or the CAP may be delayed, as indicated by a flag in the contract for example, until a POD event for the linked contract is completed. Conversely, the shipment of a product from one entity to the next can be conditioned by a flagged indicator, until an electronic transfer of funds occurs.

FIG. 5 is a functional diagram illustrating a contract linked between primary parties. Contracts are drafted on the CAP. This is done with CAP templates or toolkits. The templates can be distributed to users as a separate toolkit to be installed on their own computers, or templates can be accessed by the parties through the CAP. The templates for the present invention preferably require specification of certain minimum information, such as the buyer and seller and the targeted service or product. The present figure illustrates only the primary parties: the buyer and seller. The mutual contract of party A 701 is preferably linked to the contract of party B 703. It is the linking feature that allows all of the contracts and all of the contractual obligations of the entire supply chain to be effectively consolidated for simultaneous and automatic operation. The link may comprise a flag, address or pointer, for example, within the contract to define the pathway to the corresponding contract to which it is linked. The links may be formed in any of several possible methods which permit addressing of the contract to which the link is connected.

Contracts are drafted by, for example, one of the potential parties logging on to the system. The details of drafting a contract are further explained herein. The system may display a default framework with boilerplate language, which can be tailored to particular terms desired by the party. The purpose of the template and boilerplate is to simplify and streamline the drafting process. The drafting of contracts by numerous parties effectively provides programming that guides the CAP's operation.

Once a contract is drafted it is stored, preferably in the computing module's centralized database, to await future execution and authorization by the corresponding parties. It is possible that the contract could also be stored at a local computer system rather than in a centralized database, linked to other remote computer systems in a conventional manner; the stored contract could be obtained by conventional communications between the respective local computers for the parties. In order for the stored contract to be acted upon, it must be authorized by the parties. In order to authorize or approve the contract, conventionally available methods are used including digital signatures or encrypted signatures. When a contract is drafted, a time limit may be specified. When the time specified in the contract expires, the contract will no longer be able to be acted upon or to operate in the CAP. Other terms similarly may be included to provide for termination of operability of the contract. The CAP preferably stamps each contract with a unique identifier, advantageously a security level encrypted product/transaction identifier. This will assist in locating contracts and tracking transactions, facilitating security, authenticating and verifying contracts, and automating audits. The product/transaction identifiers could include a portion identifying those contracts within a same supply chain or initiated by a same POS or PO, for example.

FIG. 6 is a functional diagram illustrating the contract of FIG. 5 linked with one corresponding and underlying party and contract. The mutual contract of party A 701 (the buyer) is linked to the contract of party B 703A (the seller). A contract to supply goods ordinarily necessitates a contract to acquire goods or use services. Linkage of two mutual and corresponding contracts thus may also involve the linkage to a preceding and corresponding contract for the acquisition of goods or services, so that the goods can be supplied. Contracts may be linked for all parties to the chain, including suppliers to manufacturers. Here, the linkage of contracts 701 and 703A generated called for a linkage from contract 703B to a preceding contract of party C 705.

The contract of party B 703(A) optionally generates fulfillment instructions automatically. Fulfillment instructions include, but are not limited to, transmitting digital data for the storage or automatic printing or storage at the fulfillment company.

The contracts may also include information on a time schedule. The specified activity will then be initiated automatically at the time schedule specified in the contract. For example, if a certain linked contract specifies that one party is to forward supplies to the other party at a specified date and/or time, the shipping contract would not be linked and activity initiated until that date or time.

FIG. 7 is a functional diagram illustrating the contract of FIGS. 5–6 linked to an ancillary function, here a contract 707 for the shipper. In addition to the linkage to preceding contracts, it is frequently necessary to provide ancillary functions or services such as shipment of goods. Thus, when a linked contract is activated, any necessary shipping instructions are concurrently transmitted to a common carrier. Common carriers may concurrently transmit corresponding shipping labels to the fulfillment party. Bar coding for automated sorting may also be generated. The fulfilling party can have the shipper documents automatically printed at a specified location, such as the shipping department.

Shippers are ancillary parties to the businesses in the supply chain. The contracts they draft and store within the system contain a schedule of various shipping rates. These rates are then used by the CAP or computing module to calculate shipping costs. The rates and the shippers' contract terms can be linked to other parties in the supply chain in order to enable them to price shipping costs when goods are sold and also to facilitate the other parties' selection of a shipper.

Further, the CAP can optionally provide a choice of automatic or manual selection of shipping options. A shipper might be selected based upon a preference for shipping time, shipping speed, or low price, for example. The CAP optionally provides for selection of distribution options. Shipping options might advantageously be evaluated by parties based on information supplied by the CAP. This could include the cost of conventional distribution, the possibility of manufacturer's direct shipment to a different party in the supply chain, etc., to eliminate sequential shipping of the same goods between several parties in the supply chain.

When the CAP distributes fulfillment instructions to parties, those instructions optionally are integrated with a party's conventional available automated and computerized warehouse system. Such warehouse systems automate the movement of goods for staging, affixing shipping instructions, and so on. If the party does not have such a system, the CAP can, optionally, print the staging and packing instructions, so that orders can be fulfilled manually more accurately and rapidly.

FIG. 8 is a functional diagram illustrating the contract of FIGS. 5–7 linked to multiple corresponding and underlying parties and contracts. Here, the linkage of party A 701 required linkage to a the contract of party B 703A, which generated contract 703B. In turn, contract 703B required linkage to the contract 705A of party C, which generates contract 705B and is linked to the contract 706A of party D. This corresponds to contract 706B which is linked to the contract 708 of party E. Also illustrated in FIG. 8 are linkages to contracts for multiple ancillary functions. In this illustration, the ancillary functions include contracts 707 for shippers, and contracts 709 for banks.

The contracts 709 for banks permit automatic payment to and from the various parties 701, 703, 705, 706, 708. In the preferred mode of operation, the parties (or any subset thereof) may elect to disregard all accrual type transactions and rely only on an accounting based on the final EDI cash transaction. That event would provide for the distribution of the relevant transactional details that correspond to the cash payment. All of the data concerning the payments would be available to parties, but the advantage of this mode of operation is that the need to exchange all data is diminished significantly. The cost in time, bandwidth and money for operation of the digital contract system is correspondingly reduced.

More specifically, the preferred mode provides an option which in turn avoids conventional sequential payments in consideration of transactions. Such sequential payments are observed with EC, EDI and conventional business. In the preferred mode, the payments are merged. That is, the money due a preceding party (for example, party B) is deducted from the payments due from the principal party (for example, party A) and re-distributed to the preceding party. The payment due from the principal party (for example, party A) could be distributed to numerous levels of preceding parties (for example, parties B, C, D and E), after being deducted from payment due between the respective parties.

When each party in a particular supply chain is integrated into the digital contract system, a further advantage will be observed. Namely, the movement of goods is streamlined and the time frame of commerce is compressed. With the time frame compressed, it will become possible to use the money paid by the final customer or principal party in the final sale to fund and finance all the business in the supply chain. The need for layers of financing, for inventories and receivables, sometimes provided at great cost by banks, can be substantially eliminated, throughout the entire supply chain. Further, since the digital contract system optionally automates payment in consideration of transactions, it will become possible to reduce or eliminate credit, collection, receivables accounting, payables and cash functions.

In addition, all data for all transactions is generated within the digital contract system. Instead of exchanging data on every transaction, the exchange can be reduced to the exchange of reports only. Even more advantageously, a party could eliminate paper transactions by simply viewing data or reports concerning the transactions on a computer screen connected to the CAP. For example, assume that there is a transaction which according to EDI or conventional accounting would require the exchange between companies of six documents for each transaction. The exchange of these six documents is repeated for each company in the supply chain, say 20. If there were a total of 1,000 such transactions, then the total of such exchanges is 120,000. The digital contract system can optionally summarize the information for each company into one periodical report, thereby reducing or eliminating the volume of the 120,000 paper documents to one exchange for each party.

FIG. 8 more fully illustrates a supply chain for a given product. The supply chain for particular products may be different. Each supply chain may include as parties sellers, local wholesalers, district and regional distributors, manufacturing warehouses, manufacturers, suppliers to manufacturers, their respective shippers and their respective financial institutions. Since the contracts for the various parties in the supply chain have previously been stored and authorized, once party A initiates an event such as a PO, each contract for each preceding party, shipper and bank is automatically linked to the next contract. This automation is substantially simultaneous and error free, since there is the advantage that human intervention is not required. of course, a contract could be drafted so that human intervention is required, for example to authorize the transaction. A goal would be to fully integrate the entire supply chain for all products so that all business can be automated and streamlined.

Tax schedules for the various states affecting the sales of goods and services can also be linked in the same manner as other contracts in the supply chain. Conveniently utilizing a party's zip code, the appropriate tax schedule "contract" can be determined and subsequently linked. Further, state auditors could be afforded access to selected data in order to audit the accuracy of the system's reports. These "contracts", like other contracts, can be tailored to meet the requirements of each governmental jurisdiction and according to the unique reporting forms of each. It is further possible that programs furnished by states for analysis and automatic audit of tax reporting and regulatory compliance could be integrated into the system.

One advantage of the digital contract system in its preferred embodiment is that it need not separately call up each party (or their computer) in order to generate all data, documents, and instructions, since the contracts are available on a central computer system. One exception to this methodology is that the digital contract system may fetch prices or verify inventory status by gaining access to the computers of the parties. This is optional, and the data can be automatically incorporated into contracts and used to calculate prices or advise sellers of inventory status. An advantage of this exception is where insufficient inventory is available by one party or supplier, but multiple suppliers together have sufficient inventory, multiple links can be performed.

Figure 9:
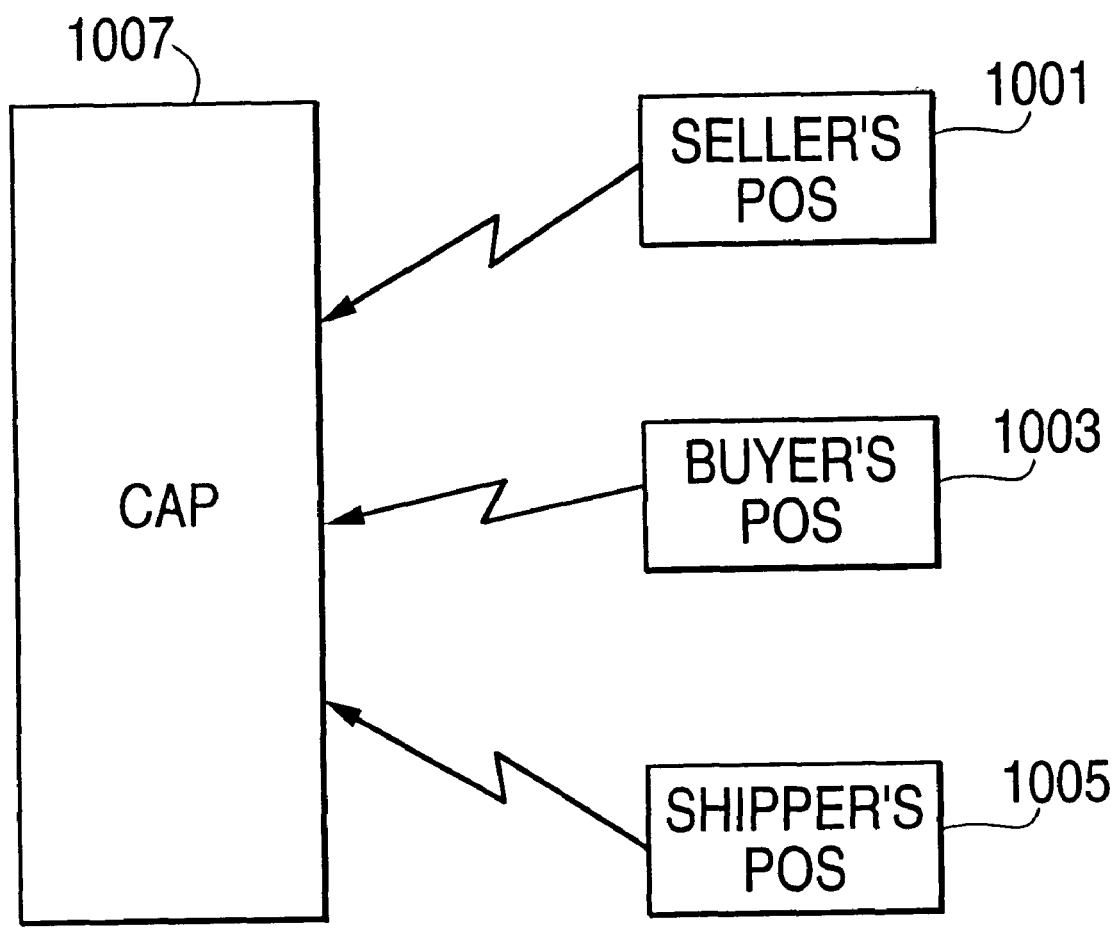
FIG. 9 is a functional diagram illustrating events triggering activity in a portion of the automated digital contract system.

FIG. 9 is a functional diagram illustrating events triggering activity in the CAP. Transmission of a seller's POS 1001, buyer's PO 1003 or shipper's POD 1005 to the CAP are events which trigger activity. When triggered by events, the stored contracts of the affected parties are linked to activate all contracts within the supply chain for that product, so that the CAP calculates automatically at the time specified in the contracts, all instructions, transactional data/reports and automatic EFT, for all parties that are contracted in the supply chain.

The contracts previously stored are activated when triggered, to operate/calculate according to the terms contained in the contracts. The term "trigger" as used herein refers to the effect the separate and independent events of POS or PO or POD have on the system. When one of these events occurs it is digitally recorded by the party. This recorded information is transmitted to the CAP, preferably to the system implemented as an internet service provider, and stored. A trigger is advantageously the basis upon which activity is initiated, thereby making possible, in part the automatic linking activity within the supply chain, and consequently the creation and exchange of new data.

The system can optionally be integrated with conventional financial, management and business analysis software programs, as a tool to generate reporting. With this option, the system preferably is sufficiently flexible so as to able to be integrated or to communicate with a party's custom accounting and reporting program.

Buyers of goods can use the CAP to post a request to purchase specific goods or services, as one enhancement. If the goods or services are not immediately available, the request will remain stored until such time as a supplier of those goods or services posts a proposal to sell such goods or services.

In addition to entering contracts on the system, it is optionally possible for sellers of goods or services to post their prices on the CAP, according to another enhancement. A user may request a report on comparative prices. From the posted prices and from prices listed in contracts, the system then generates and displays a report of those prices to potential customers.

The CAP optionally has stored a master directory, which contains information on suppliers, goods and services not otherwise listed in the system, and a contact address for the suppliers. When a product or services is requested that is not otherwise listed in the system, the CAP accesses the stored master directory, locates the requested good or service, and contacts the supplier by generating an automatic notification. Where the supplier's contact address is accessible electronically or via facsimile, the notification is delivered to the electronic address or facsimile number. If, on the other hand, the supplier's contact address is not accessible electronically, the CAP generates a hard copy which is manually mailed to the address or a telephone call is performed.

The CAP is "contract" based. That is, contracts are used as the basis for calculating any of the numerous contractual terms with respect to instructions, data generation, reporting and banking, and other functions required or desired in order to conduct business. Contracts may include the following:

- the goods or services
- the number of goods
- the price of the goods or services
- terms for execution or ratification of the contract
- "Linkages" and terms for "triggers"
- fulfillment instructions
- shipping instructions
- transactional data to be generated
- data to be distributed
- approval/deviation terms and methods
- sales tax provisions
- EFT instructions
- destination of instructions and reports
- form of instructions and reports
- other terms depending on the transaction or product Default terms can be provided if the party does not supply specific terms. Certain terms preferably require specification rather than resorting to a default, such as: the goods or services; the number of goods; and the price of the goods or services.

Advantageously, goods can be identified in the contract by established commercial bar code product identifications and classifications. For some operations or functions, these could be read in from the product bar code label by a scanner, for example.

A party may either deposit a drafted contract for storage onto the computing module's central database, or may store the drafted contract on the party's computer. The CAP or computing module would then automatically contact the party's computer and fetch the data for incorporation into the contracts that are stored on the central database.

The system uses a "top down" methodology, in which the final sale is the basis by which transactions of the entire supply chain are triggered linked and data is automatically generated, from the top to the bottom. This is in contrast to conventional computing and accounting, which is bottom up: the suppliers transmit goods and data to the manufacturers, manufacturers do the same with distributors, culminating with the seller. This is a major advantage over conventional methods which in contrast are bottom up and sequential.

An inventory management system may, optionally, be included in the system. A conventional inventory management system performing traditional functions can be incorporated; in this case, however, the inventory management system would manage numerous companies. It would be integrated into the system by automatically adjusting for a reduction or increase in inventory, for example, when an event occurs in the system which evidences a reduction or increase in inventory. The advantage of incorporating the inventory management system is that a fuller cycle of the business for each member of the entire supply chain will be combined and thus operations can be compressed for even more efficient and more timely production, improved inventory management, and improved shipping logistics.

A party optionally may specify that the CAP will store the gross detail of all of its conventional transaction data. As one alternative to the option, the party may specify that the CAP store only initial source data (that is, initially generated by POS or PO and POD), thereby eliminating the need to actually store data for which the system can re-create the intervening details. In conventional accounting there is a great deal of duplication when considering the entire supply chain: e.g., one party's PO corresponds to another party's invoice. An advantage of the system is that the PO is effectively the same as the corresponding invoice, so that only one is stored, in order to consolidate the volume of stored data. As yet another alternative, the CAP can transmit gross and/or source data to a requesting party, in order that the party may store the data in its own system, or it may print reports to store in hard copy format.

The CAP optionally maintains a log of inquiries and transactions which are initiated, completed, and in progress on the system. One of skill in the art will appreciate that the log could contain, for example, a log of events and corresponding supply chain entities; a log of contracts which are created and corresponding identification numbers; or a log of disputes and resolution of disputes; and so on.

The system has been illustrated in various somewhat minimal configurations. It will be appreciated that in practice the system most effectively includes multiple customers, multiple sellers, multiple enterprises, and multiple banks, and that there will be multiple connections between many of these entities.

In addition, the system has been generally discussed as if each party has a traditional computing device, such as a personal computer, main frame computer, or minicomputer. However, a party's interface could include other commercially available devices, for example, any device designed to communicate with another appropriately programmed device, such as point-of-sale devices, interactive television, interactive cable, smart telephones, and hard-wired links. The interface could also comprise dumb terminals communicating with software on mainframes or CAP.

Pseudo-code expressing one possible embodiment of the software on the CAP follows.

PSEUDO CODE EXAMPLE

```
/***************************************************
/* The pseudo-code assures that housekeeping is
done as is conventional to insure that data
formats are in compliance and that errors are
handled appropriately. The purpose of this
pseudo-code is to provide guidance as to one
method of elegantly programming the CAP. Other
equally viable programs will be appreciated by one
of skill in the art, in many languages, including
C, C++, assembly, COBOL, etc. It will equally be
appreciated that the CAP and computing module can
be programmed as a framework utilizing objects.
For the purpose of this pseudo-code, we create an
internal contract event to iteratively process the
supply chain.
***************************************/
/*****************top level routine **********
Top_13 Level /* This is the top level loop. It
                /* handles most events in real time.
    contract: global record(product_transaction_id,
        customer_id, product_service_id, bank_id,
        entity_id (array (2)), product, amount,
        cost, instructions); /*format of contract
            /*to be handled
            /*for events
    Begin
    Repeat
        receive_event (event); /*receive the event
                /* (whatever it is)
                /* and all associated data
            process_event (event); /* process the event
                /* appropriately
        until terminated. /* keep processing
                /* events until
                /* we are terminated
    End.
/*********** routines called by Top_Level******
Receive_event (event)
        data_format:: global array (n);
        event:: array(1)
/* This routine receives an event and returns the
/* event for later processing. It assumes that
/* any information associated with an event is
/* read into the array data_format */
        begin
    event := error; /*initialize "event"
    if (data_format = true) then /* is there
                /* something in the "data_format"
                /* record? if so,
        read_in (data_format); /* read received
                /* information into a
                /* generic data format, check for
                /* errors, and ensure that it is
                /* formatted as expected.
        event := data_format (event); /* now that
                /* data_format is formatted as
            /* expected, the "event" field
            /* should contain the event code
    return.
Process_event(event)
    /* This routine processes each event. It can be
```

```
            -continued

/* easily expanded to provide for additional
    /* internal events.
        Begin
    /* Each event can readily.be processed in an
    /* event-specific subroutine
            Case event of:
                POS: process_POS(data_format);/*POS event
                POD: process_POD(data_format);/*POD event
                PO: process_PO(data_format);/*PO event
                internal_contract: process_PO(data_format);
                    /*internal contract treated as
                    /*a PO event.
                ratification: process_ratify(data_format)
                    /*contract was
                    /*ratified
            else; /* a non-event-do nothing
        endcase;
            return.
    /*****Routines called by Process_Event****
    Process_POS (data_format)
    /* This routine processes the POS (point of sale)
    /* event. Received information is placed into the
    /* contract format, the contract is ratified if
    /* possible, and the next contracts within the
    /* supply chain are automatically initiated
            Begin
                Contract := data_format; /* stick the received
                        /* data into the contract. we
                        */* assume that all is well with the
                        /* data format by this time.
                        /* If the contract is "ratified",
                        /* store it in the contracts
                        /* database
                If contract(ratified) = true then
                    write contract(contract) /* contracts might be
                            /* automatically ratified
                    calc_n_report(contract) /*perform automatic
                            /*accounting calculations and
                            /* reporting for this contract as
                            /* instructed
                    get_next_contract(contract(product_service_id,
                        entity_id), next_contract) ./*obtain the next
                            /*contract in the chain.
                            /* Access the product from the
                            /* product_service_id; determine
                            /* where we are in the chain from the
                            /* two entity ids; get any contract
                            /* from a *next* entity that fits
                            /* the contract criteria
                    data_format := next_contract
                            /*treat the next_contract as if it
                            /*were just received. process it
                            /*automatically and go through
                            /*all of the supply chain if
                            /*possible.. If we're at the end of
                            /*a chain, we'll wait for other
                            /*events to occur
                else
                    temp_store_contract(contract) /* not ratified?
                            /* then we must
                            /* wait for a ratification
            return.
    Process_PCD (data_format)
    /* This routine processes the POD (proof of
    /* delivery) event.
            Begin
                If no_dispute = true then /* allow for a
                            /* party to
                            /* indicate whether it
                            /* may want to dispute
                            /* completion of a contract
                    Contract := data_format; /* stick the data
                            /* into the contract. we assume
                            /* that all is well with the
                            /* data format by this time.
                    process_finances (contract); /* calculate
                            /* payables
                            /* due to/from entities in
                            /* contract; initiate EFT -continued /* transaction.
            return.
    Process_PO (data_format)
    /* This routine processes the POD (product order)
    /* event.
            Begin
                Contract := data_format; /* stick the received
                        /* data into the contract. we
                        /* assume that all is well with the
                        /* data format by this time.
                        /*If the contract is "ratified",
                        /* store it in the contracts
                        /*database
                If contract(ratified) = true then
                    write_contract(contract) /* contracts might be
                            /* automatically ratified
                    get_next_contract(contract(product_service_id,
                        entity_id), next_contract) /*obtain
                            /*the next contract in the chain.
                            /* Access the product from the
                            /* product_service_id; determine
                            /* where we are in the chain from
                            /* the two entity ids; get any
                            /* contract from a *next* entity
                            /* that fits the contract criteria
                    data_format := next_contract
                            /*treat the next_contract as if it
                            /*were just received. process it
                            /*automatically and go through
                            /*all of the supply chain if
                            /*possible. If we're at the end of
                            /*a chain, we'll wait for other
                            /*events to occur
                else
                    temp_store_contract(contract) /* not ratified?
                            /* then must wait for a
                            /* ratification
            return.
    Process_ratify (data_format)
    /*This. routine processes a ratification of
    /*a contract that was not automaticaily ratified.
            Begin
                temp_retrieve_contract (contract)
                        /* retrieve contract
                        /* data from temporary storage,
                        /* where it was previously stored
                        /* by "temp_store_contract"
                        /* routine.
                write_contract(contract) /* contract was
                        /* ratified this time - it should
                        /* be stored now.
                calc_n_report(contract)
                        /*perform automatic accounting
                        /*calculations and reporting
                        /*for this contract as instructed
                get_next_contract(contract(product_service_id,
                    entity_id), next_contract) /*obtain
                        /*the next contract in the chain.
                        /* Access the product from the
                        /* product_service_id; determine
                        /* where we are in the chain from
                        /* the two entity ids; get any
                        /* contract from a *next* entity
                        /* that fits the contract criteria
                    data_format := next_contract
                        /*treat the next_contract as if it
                        /*were just received. process it
                        /*automatically and go through
                        /*all of the supply chain if
                        /*possible. If we're at the end of
                        /*a chain, we'll wait for other
                        /*events to occur
            return.
```

While specific embodiments of the invention have been described and illustrated, it will be clear that variations in the details of the embodiments specifically illustrated and described may be made without departing from the true spirit and scope of the invention as defined in the appended claims and equivalents thereof.

What is claimed is:

1. A method for digital automation of supply chains in a vertical marketplace, comprising:
   (a) generating, in a computerized system, at least one non-ratified contract for a transaction in one supply chain of the supply chains, wherein the non-ratified contract has a plurality of terms;
   (b) ratifying the contract and storing the contract as a ratified contract in a database in the computerized system, said contract identifying the contracting parties, the goods or services, and the payment details;
   (c) checking, in the computerized system, whether at least one term of the plurality of terms in the ratified contract indicates that at least one next contract is necessary for a next transaction in the supply chain, and if so, automatically performing steps (a) and (b) and (c) for the at least one next contract;
   (d) storing, in the database, links between each ratified contract and at least one next contract that relates to the same goods or services and that relates to parties vertically linked in the distribution chain for goods and services;
   (e) in response to marketplace events relating to sales of, deliveries of, or payments for goods and services, triggering the calculation, based upon the payment details specified in the related contracts, of the payable due to and from each of the parties; and
   (f) following such an event, and in accordance with the contracts, executing payments directly between the parties of the net amount due to and from each party such that gross payments need not pass through one party to the next.

2. The method of claim 1, where step (f) is delayed when one of the terms in the ratified contract or non-ratified contract indicates a delay before the execution of payments.

3. The method of claim 1, wherein a first performance of step (a) is initiated by transmitting a request for a product from a customer to a seller.

4. The method of claim 1, wherein one of the terms requires delivery of a product from a first entity to a second entity, further comprising the step of creating and storing a record, when the product is provided, with information that the product is delivered.

5. The method of claim 1, further comprising the step of providing a digital template of the contract prior to step (a).

6. The method of claim 1, wherein the generating step further comprises forwarding the non-ratified contract from a first entity to a second entity specified in the non-ratified contract, and the ratifying step includes digital acceptance by the second entity.

7. The method of claim 1, wherein a unique identifier for the supply chain is associated with each contract and each transaction.

8. The method of claim 1, further comprising the step of receiving, in the computerized system, a request to view a portion of the database, via a communication link.

9. The method of claim 1, wherein the terms include any required time for performance, instructions for electronic banking, instructions for communications, and any transactional calculations.

10. The method of claim 1, wherein the ratifying step is via a digital signature.

11. A method for digital automation of supply chains in a vertical marketplace, comprising:
   (a) providing a digital template of a non-ratified contract;
   (b) generating, in a computerized system, at least one non-ratified contract for a transaction in one supply chain of the supply chains, wherein the non-ratified contract has a plurality of terms, and automatically forwarding the non-ratified contract from a first entity to a second entity specified in the non-ratified contract;
   (c) ratifying the contract by digital acceptance by the second entity and storing the contract as a ratified contract in a database in the computerized system, said contract identifying the contracting parties, the goods or services, and the payment details;
   (d) checking, in the computerized system, whether at least one term of the plurality of terms in the ratified contract indicates that at least one next contract is necessary for a next transaction in the supply chain, and if so, automatically performing steps (b) and (c) and (d) for the at least one next contract that relates to the same goods or services and that relates to parties vertically linked in the distribution chain for goods and services;
   (e) in response to marketplace events relating to sales of, deliveries of, or payments for goods and services, triggering the calculation, based upon the payment details specified in the related contracts, of the payable due to and from each of the parties; and
   (f) following such an event, and in accordance with the contracts, executing payments directly between the parties of the net amount due to and from each party such that gross payments need not pass through one party to the next;
   (g) storing, in the database, links between each ratified contract and at least one next contract;
   (h) associating a unique identifier for the supply chain with each contract and each transaction;
   (i) wherein a first performance of step (b) is initiated by transmitting a request for a product from a customer to a seller;
   (j) wherein one of the terms requires delivery of a product from one entity to an other entity, further comprising the steps of creating and storing a record, when the product has been provided, with information that the product is delivered; and calculating payables and transferring payment from each second entity to each first entity; and
   (k) wherein the database stores information on amounts due and payable by a plurality of entities including the first entity and the second entity, and wherein the calculating step includes offsetting amounts due between the plurality of entities.

12. The method of claim 11, wherein the terms include any required time for performance, instructions for electronic banking, instructions for communications, and any transactional calculations.

13. The method of claim 11, wherein the ratifying step is via a digital signature.

14. A system for digital automation of supply chains in a vertical marketplace, each of the supply chains having a plurality of transactions between a plurality of parties including a buyer, a seller and a supplier, including at least one transaction between the buyer and the seller, and a transaction between the seller and the supplier, comprising:
   (a) storage in a database for at least one non-ratified contract corresponding to each transaction of the plurality of transactions in one of the supply chains, wherein each non-ratified contract has a plurality of terms, and wherein each non-ratified contract is approved by one of the parties;

(b) storage in the database for at least one ratified contract corresponding to each of the non-ratified contracts, wherein the ratified contract is approved by an other one of the parties, said contract identifying the contracting parties, the goods or services, and the payment details;

(c) a plurality of stored links between ratified contracts, including at least one link between the ratified contracts for the transaction in the supply chain between the buyer and the seller and the ratified contract for the transaction in the supply chain between the seller and the supplier that relate to the same goods or services in the distribution chain;

(d) a computer implemented calculation mechanism which, in response to triggering marketplace events relating to sales of, deliveries of, or payments for goods and services, calculates, based upon the payment details specified in the related contracts, the payable due to and from each of the parties; and (e) a computer-implemented payment mechanism which, following such an event, and in accordance with the contracts, executes payments directly between the parties of the net amount due to and from each party such that gross payments need not pass through one party to the next.

15. The system of claim 14, wherein one of the terms in the ratified contract or non-ratified contract indicates a delay before the execution of payments.

16. The system of claim 14, further comprising a digital template of the non-ratified contract.

17. The system of claim 14, wherein a unique identifier for the supply chain is associated with each contract.

18. The system of claim 14, wherein the computerized system includes links between ratified and non-ratified contracts in the specified portion, and the links are traversable responsive to a received request to view a specified portion of the database.

19. The system of claim 14, wherein the terms include any of required time for performance, instructions for electronic banking, instructions for communications, and any transactional calculations.

20. The system of claim 14, wherein one of the terms indicates delivery of a product from a first entity to a second entity is required, and wherein the database includes storage for records with information that the product is delivered, when the product is delivered.

21. The system of claim 20, wherein the database includes storage for records of calculated payables for payment from the second entity to the first entity.

22. The system of claim 21, wherein the database includes storage for records of information on amounts due and amounts payable by a plurality of entities including the first entity and the second entity, and amounts due between the plurality of entities are offset in the stored calculated payables.

23. A method for using an electronic data processing system to manage the accounting of parties carrying out common transactions in a vertical marketplace, said method including the following steps:

establishing on the system digital representations of contracts between the parties, each contract identifying the contracting parties, the goods or services, and the payment details;

within the system, establishing digital linkages between contracts that relate to the same goods or services and that relate to parties vertically linked in the distribution chain for those goods and services;

in response to marketplace events relating to sales of, deliveries of, or payments for goods and services, triggering the calculation, based upon the payment details specified in the related contracts, of the payable due to and from each of the parties; and following such an event, and in accordance with the contracts, executing payments directly between the parties of the net amount due to and from each party such that gross payments need not pass through one party to the next.

24. A method in accordance with claim 23 wherein at least one of the contracts contains a term that calls for a delay between a marketplace event and the execution of payments.

25. A method in accordance with claim 23 wherein one of said marketplace events is the receipt of a request for a product transmitted from a customer to a seller.

26. A method in accordance with claim 23 wherein one of said marketplace events is the delivery of a product, and wherein a permissible contract term is product delivery.

27. A method in accordance with claim 23 wherein a digital template for a contract is provided.

28. A method in accordance with claim 23 wherein both ratified and non-ratified contracts can be created and which method includes the steps of transmitting a non-ratified contract from a first entity to a second entity specified in the non-ratified contract, and thereafter receiving digital acceptance and ratification of the contract from the second party.

29. A method in accordance with claim 23 and further comprising the step of receiving, in the computerized system, a request to view a portion of the database, via a communication link.

\* \* \* \* \*